(12) United States Patent
Tartz et al.

(10) Patent No.: US 9,380,145 B2
(45) Date of Patent: Jun. 28, 2016

(54) DYNAMIC TAPPING FORCE FEEDBACK FOR MOBILE DEVICES

(75) Inventors: Robert S. Tartz, San Diego, CA (US); Bennett M. King, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 12/940,409

(22) Filed: Nov. 5, 2010

(65) Prior Publication Data

US 2012/0115445 A1    May 10, 2012

(51) Int. Cl.
*G06F 3/01*  (2006.01)
*H04M 1/725*  (2006.01)
*H04M 19/04*  (2006.01)

(52) U.S. Cl.
CPC .......... *H04M 1/72547* (2013.01); *G06F 3/016* (2013.01); *H04M 19/047* (2013.01)

(58) Field of Classification Search
CPC .. G06F 3/015; H04M 19/047; H04M 1/72547
USPC ....................................... 455/414.1, 466, 567
See application file for complete search history.

(56) References Cited

U.S. PATENT DOCUMENTS

| 7,801,569 | B1* | 9/2010 | Zellner ........................... 455/567 |
| 2004/0214594 | A1* | 10/2004 | Holman, IV ................ 455/550.1 |
| 2004/0252857 | A1 | 12/2004 | Lewis |
| 2006/0066569 | A1* | 3/2006 | Eid et al. ........................ 345/156 |
| 2006/0116175 | A1* | 6/2006 | Chu ............................... 455/567 |
| 2006/0136630 | A1 | 6/2006 | Eid et al. |
| 2006/0248183 | A1 | 11/2006 | Barton |
| 2007/0146316 | A1 | 6/2007 | Poupyrev et al. |
| 2008/0001484 | A1 | 1/2008 | Fuller et al. |
| 2008/0129147 | A1* | 6/2008 | Thiesen et al. ................. 310/319 |
| 2008/0287147 | A1 | 11/2008 | Grant et al. |
| 2009/0076723 | A1* | 3/2009 | Moloney ........................ 701/209 |
| 2009/0184808 | A1 | 7/2009 | Kim |
| 2009/0280860 | A1* | 11/2009 | Dahlke ....................... 455/556.1 |
| 2009/0325647 | A1* | 12/2009 | Cho et al. ....................... 455/567 |

(Continued)

FOREIGN PATENT DOCUMENTS

| CN | 1799282 A | 7/2006 |
| CN | 101305416 A | 11/2008 |

(Continued)

OTHER PUBLICATIONS

Levin and Woo, "Tactile-Feedback Solutions for an Enhanced User Experience", Information Display 2009, pp. 18-21.

(Continued)

*Primary Examiner* — Ariel Balaoing
(74) *Attorney, Agent, or Firm* — Charles E. Eggers

(57) ABSTRACT

Dynamic force feedback is provided in a device to alert a user about a message received on the device from a remote user and to convey content, context, or a type of the message. Producing dynamic force feedback may include activating a motion induction device, which accelerates and decelerates a mass to create tapping within the device. The amplitude and frequency of the tapping may be configured to produce sequences of taps to alert the user about different types, contexts, or content of received messages. Additionally, multiple motion induction devices may be included in a device to produce dynamic force feedback along multiple dimensions. Multiple dimension dynamic force feedback may be used in providing geographical directions to a user.

19 Claims, 18 Drawing Sheets

(56) References Cited

U.S. PATENT DOCUMENTS

| | | |
|---|---|---|
| 2010/0267424 A1 | 10/2010 | Kim et al. |
| 2010/0273469 A1* | 10/2010 | Seban et al. .................. 455/418 |

FOREIGN PATENT DOCUMENTS

| | | |
|---|---|---|
| EP | 2244169 A2 | 10/2010 |
| JP | H10313933 A | 12/1998 |
| JP | 2000042491 A | 2/2000 |
| JP | 2003083762 A | 3/2003 |
| JP | 2004503004 A | 1/2004 |
| JP | 2005190428 A | 7/2005 |
| JP | 2006075734 A | 3/2006 |
| JP | 2006088145 A | 4/2006 |
| JP | 2007166450 A | 6/2007 |
| JP | 2008066966 A | 3/2008 |
| JP | 2008259409 A | 10/2008 |
| JP | 2009508446 A | 2/2009 |
| JP | 2010506302 A | 2/2010 |
| JP | 2010528532 A | 8/2010 |
| KR | 20100116034 A | 10/2010 |
| WO | WO0203172 A2 | 1/2002 |
| WO | WO-2007033244 A2 | 3/2007 |
| WO | WO2007033246 A2 | 3/2007 |
| WO | WO-2008042745 A2 | 4/2008 |
| WO | WO-2008144108 A1 | 11/2008 |
| WO | WO-2009138814 A1 | 11/2009 |
| WO | WO-2010104953 A1 | 9/2010 |

OTHER PUBLICATIONS

Li, Kevin et al., "Tapping and Rubbing: Exploring New Dimensions of Tactile Feedback with Voice Coil Motors", UIST'08, Oct. 19-22, 2008, Monterey, California, USA 10 pages.

Immersion Corporation, "Nokia Licenses Immersion's VibeTonz® Tactile Feedback for Mobile Devices", COMTEX, San Jose, CA, Jul. 2, 2007, 2 pages.

International Search Report and Written Opinion—PCT/US2011/058788—ISA/EPO—Feb. 17, 2012.

\* cited by examiner

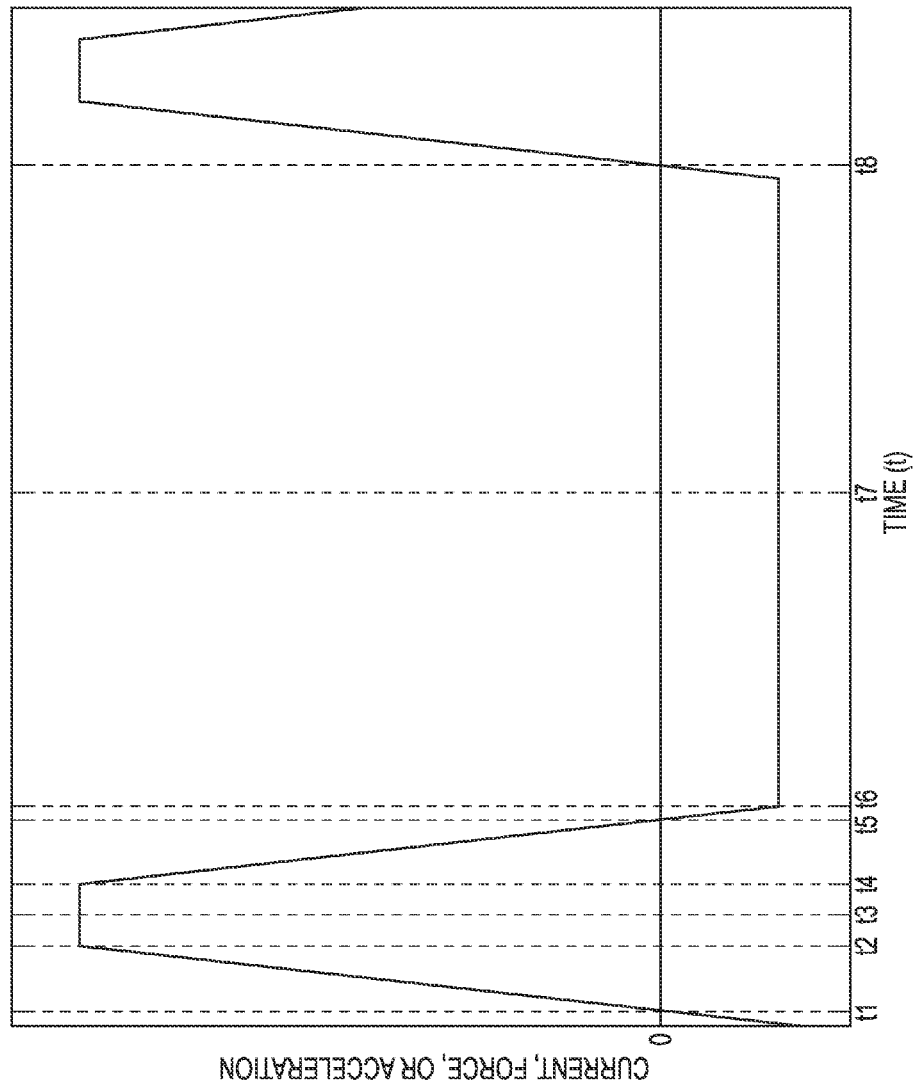

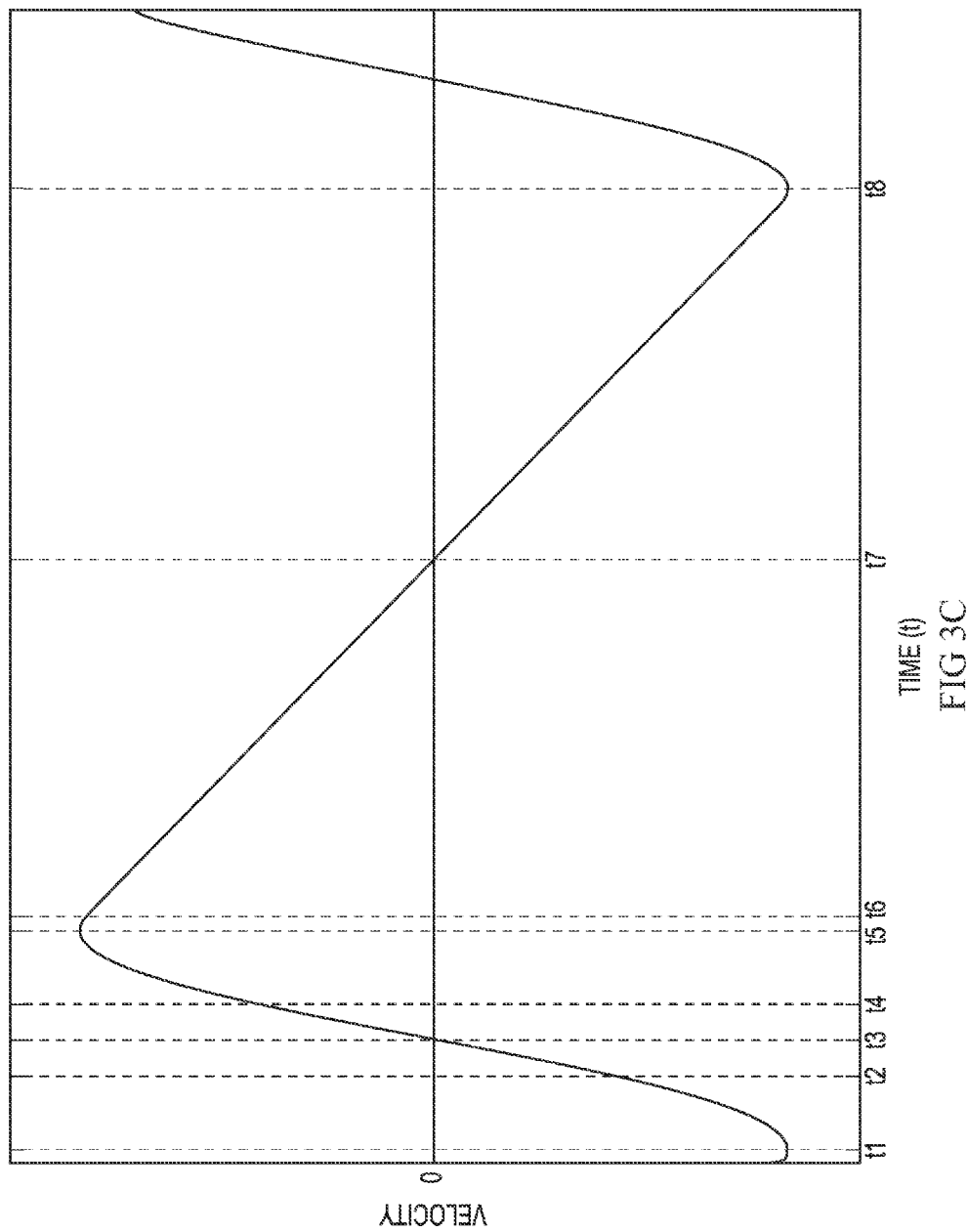

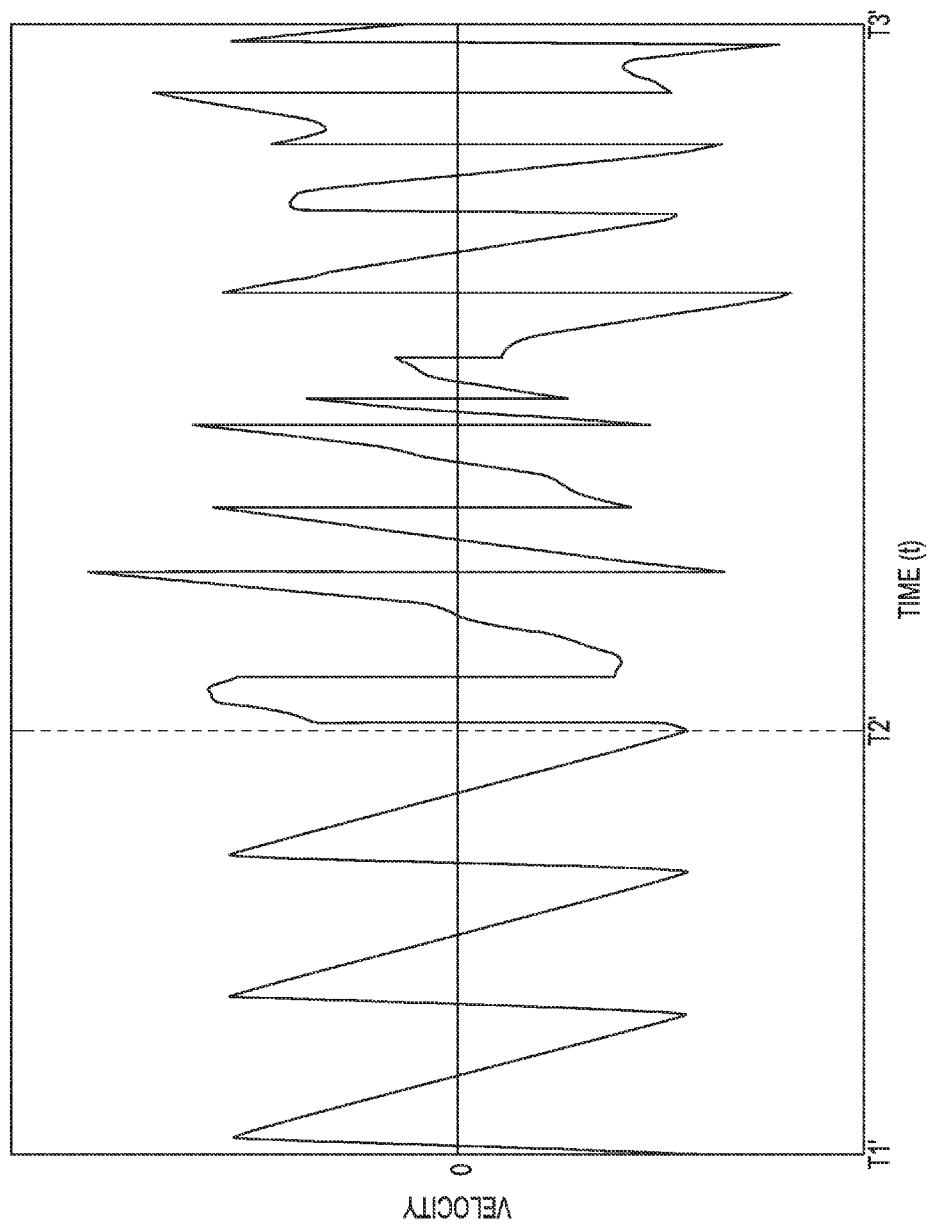

DYNAMIC TAPPING FORCE FEEDBACK FOR MOBILE DEVICES

TECHNICAL FIELD

The disclosure relates to motion induction, and more particularly, to motion induction in wireless devices.

BACKGROUND

Mobile devices, such as audio players and cellular phones, often include vibration devices for providing the user feedback about conditions on the wireless device. For example, a cellular phone may vibrate when an incoming call is ringing. Vibration motors are conventionally rotating eccentric mass motors in which a mass is rotated about a fixed point. Vibration motors typically draw large current during operation, which is undesirable for battery powered mobile devices. Additionally, vibration motors have haptic bandwidth. Mobile devices may have several kinds of feedback to provide the user such as, for example, low battery and incoming call. The limited bandwidth of vibration motors inhibits mobile devices from providing different alerts to the user through the vibration motor.

Thus, there is a need for a low power notification device for providing dynamic feedback to users of mobile devices.

BRIEF SUMMARY

In an aspect of the present disclosure, a method includes determining a type, a content, and/or a context of a message received from a remote user to convey to a local user of a device. The method also includes providing dynamic force feedback in a first direction to the local user depending on the type, the content or the context of the message.

In another aspect, a method includes determining a type, a content, and/or a context of a message to convey to a user of a device. The method also includes providing dynamic force feedback in a first direction to the user depending on the type, the content or the context of the message. The dynamic force feedback provides a direction to geographically guide the user.

In another aspect, a device has a first motion induction device having a mass; and a controller. The controller is configured to operate the mass of the first motion induction device to provide dynamic force feedback in the device. The dynamic force feedback conveys a type, a content, and/or a context of a message received from a remote user.

In yet another aspect, a device has means for inducing motion and means for operating. The operating means is for operating the motion inducing means to provide dynamic force feedback in the device. The dynamic force feedback conveys a type, a content, and/or a context of a message received from a remote user.

In a further aspect, a computer readable medium tangibly stores a computer program. The medium includes a messaging code segment that determines a type, a content, and/or a context of a message received from a remote user to convey to a local user of a device. The medium also includes a force feedback code segment that instructs dynamic force feedback along a first direction to the local user depending on the type, the content, and/or the context of the received message.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIGS. 3A, 3B, and 3C illustrate exemplary current, displacement, and velocity profiles for the mechanism of FIG. 2.

FIGS. 4A, 4B, and 4C illustrate alternative exemplary current, displacement and velocity profiles for the mechanism of FIG. 2.

DETAILED DESCRIPTION

Figure 1:
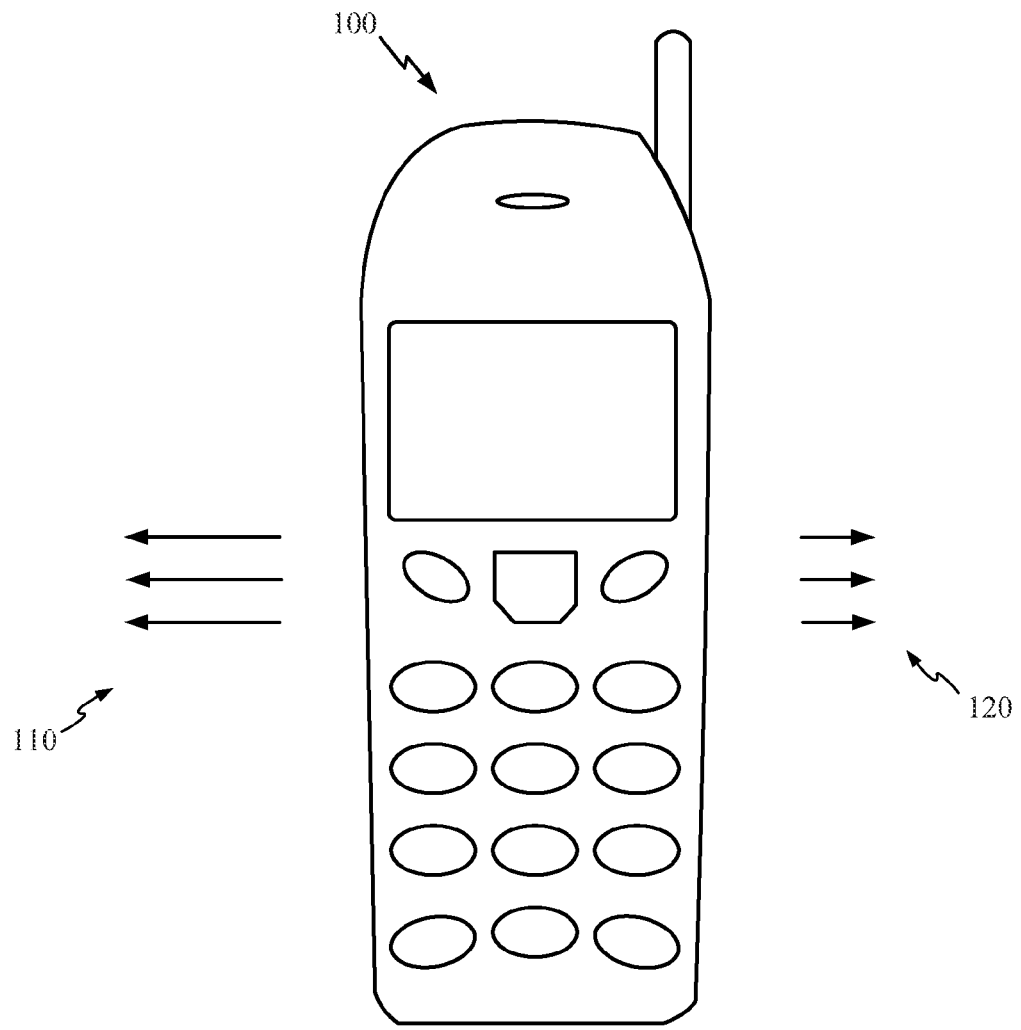
FIG. 1 illustrates an exemplary embodiment of a handheld device incorporating force induction techniques of the present disclosure.

FIG. 1 illustrates an exemplary embodiment of a handheld device 100 incorporating force induction techniques of the present disclosure. In FIG. 1, the handheld device 100 is shown as a mobile phone. One of ordinary skill in the art will appreciate that a handheld device of the present disclosure need not be a mobile phone, and may generally be any type of handheld device, e.g., a personal digital assistant (PDA), a personal navigation device, smart phone, etc. Such alternative exemplary embodiments are contemplated to be within the scope of the present disclosure.

According to the present disclosure, the handheld device 100 is configurable to generate a force impulse that is tactilely and/or kinesthetically perceptible to a user (not shown in FIG. 1) of the handheld device 100. Such physical impulses may be useful when other visual or audible indications are less effective due to, e.g., physical restrictions of the environment, or physical impairments of the user. In FIG. 1, the handheld device 100 may generate, e.g., one or more sharp physical impulses 110, or "knocks," to the left side of the handheld device 100 that are tactilely perceptible to a user. Similarly, the handheld device may generate similar knocks 120 to the right side of the handheld device 100. In an exemplary embodiment, a left knock 110 may signal the left direction to the user of the handheld device 100, while a right knock 120 may signal the direction to the right. In alternative exemplary embodiments, it will be appreciated that directional impulses to the right, top, bottom, front, back, or any local portion of the handheld device 100 may be similarly generated and felt by the user.

Figure 1A:
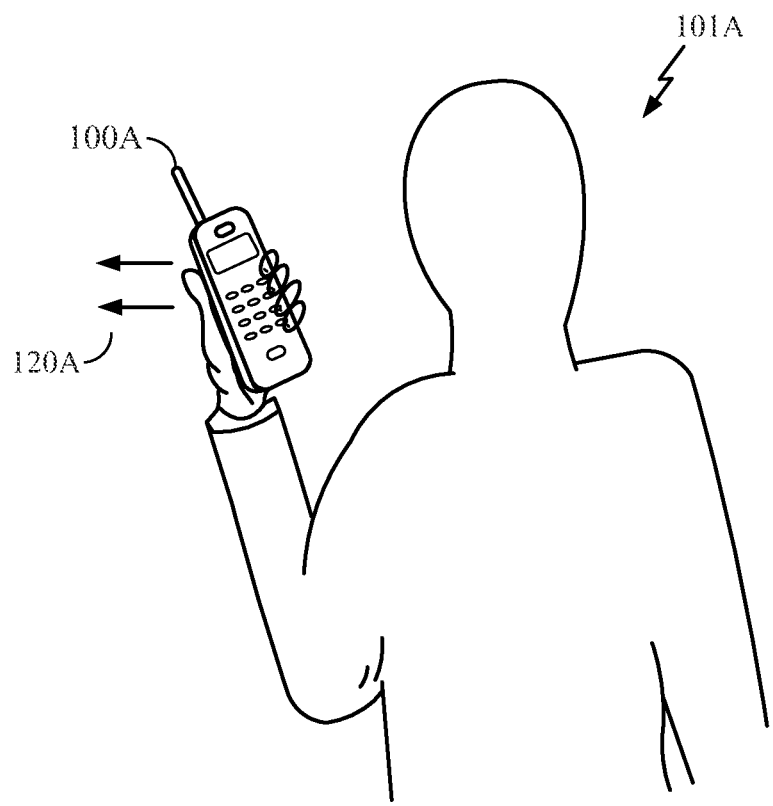
FIG. 1A illustrates an exemplary embodiment of the present disclosure in a handheld personal navigational device according to the present disclosure.

FIG. 1A illustrates an exemplary embodiment of the present disclosure in a handheld personal navigational device 100A according to the present disclosure. Note FIG. 1A is shown for illustrative purposes only, and is not meant to limit the scope of the present disclosure to navigational devices. In FIG. 1A, the device 100A is configured as a personal navigational device that determines a target location specified by the user 101A relative to a present location of the user 101A. It will be appreciated that the determination of present and target locations by a navigational device is known in the art, and may utilize, e.g., satellite signals from the global positioning system (GPS). To guide the user 101A to the target location, the device 100A may generate one or more knocks or directional impulses to a side of the device 100A, as illustrated by 120A in FIG. 1A. In the exemplary embodiment shown in FIG. 1A, the knocks 120A are generated to the left side of the device 100A to indicate that the user should proceed to the left to reach a target location.

Figure 2:
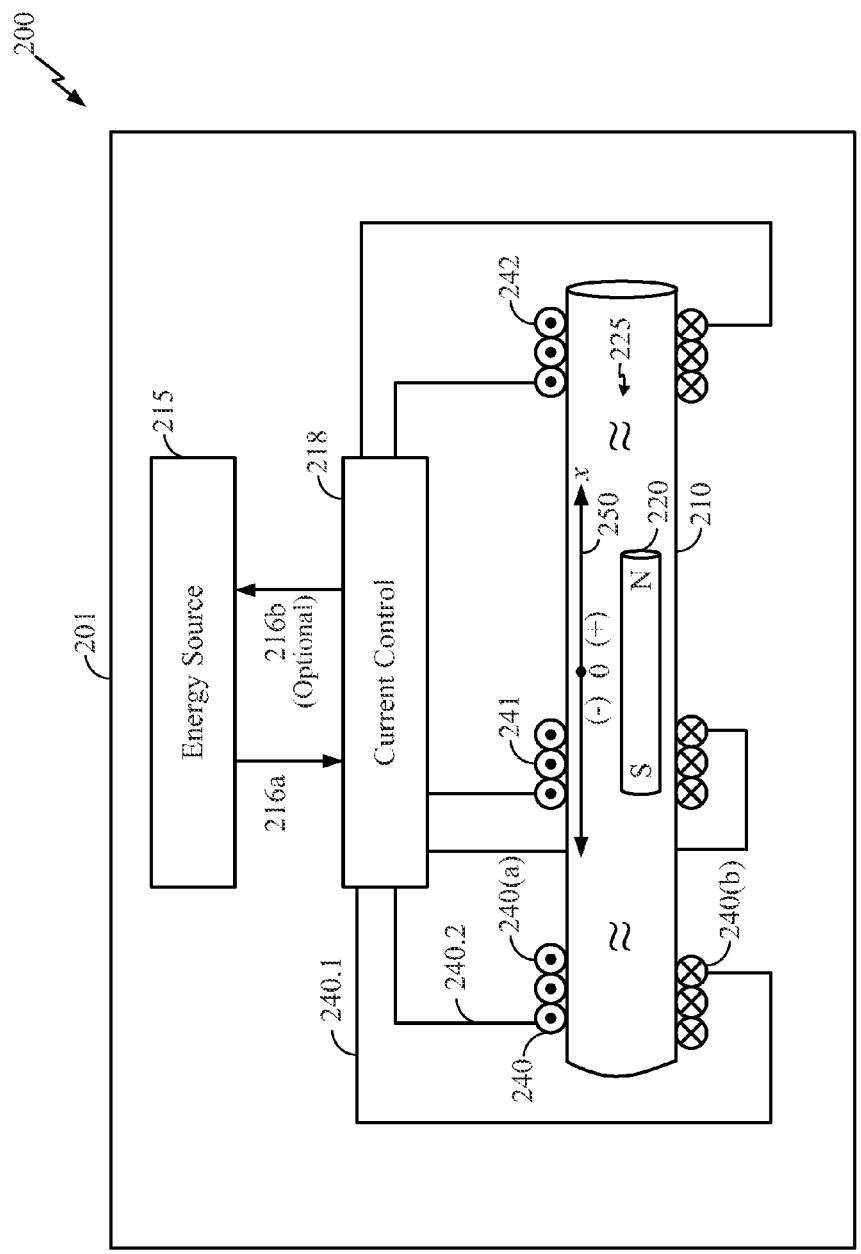
FIG. 2 illustrates an exemplary embodiment of a mechanism for generating tactilely perceptible physical impulses using motion induction techniques according to the present disclosure.

FIG. 2 illustrates an exemplary embodiment 200 of a mechanism for generating tactilely perceptible physical impulses using force induction techniques according to the present disclosure. In FIG. 2, a chassis 201 is provided on which the components of the mechanism 200 may be mounted. The chassis 201 may be, e.g., a physical chassis of a handheld device 100 as shown in FIG. 1. Alternatively, the chassis 201 may in turn be mounted on a separate chassis of the handheld device 100.

The chassis 201 is coupled to a fixed mechanical support 210, which is shown as a hollow tube in FIG. 2. The tube 210 is hollow along an ordinate axis 250 (also denoted herein as a "first axis"). A magnetic element 220 having a north pole (N) and a south pole (S) may be present inside the tube 210. In an exemplary embodiment, the inside of the tube 210 may include a vacuum, and the magnetic element 220 may be constrained to move along the axis 250. In FIG. 2, the variable x may describe the net lateral displacement of the center of the magnetic element 220 relative to a center of the tube 210 along the axis 250, with the center of the tube 210 corresponding to x=0. One of ordinary skill in the art will appreciate that the ordinate axis 250 is shown for descriptive purposes only, and is not meant to limit the scope of the present disclosure. For example, in alternative exemplary embodiments, the center of the ordinate axis may reference any arbitrary point on the tube 210.

In an exemplary embodiment, the interior of the tube 210 may be lined with a low-friction material, e.g., PTFE or "Teflon," or lined with a lubricant. Wound around the tube 210 are one or more sets of electrically conducting wound coils, three coils 240, 241, 242 of which are shown in cross-section in FIG. 2. Description of the first coil 240 is given hereinbelow; it will be appreciated that similar description may apply to coils 241, 242, and any other number of coils in alternative exemplary embodiments.

The first coil 240 is wound at least once, and preferably many times, around the tube 210. First 240.1 and second 240.2 ends of the first coil 240 are coupled to a current control block 218. Current flow is shown in FIG. 2 with 240(a) representing current flow into the plane of the cross section, and 240(b) representing current flow out of the plane of the cross section. Block 218 controls the current flowing through the first coil 240. Coils 241 and 242 similarly have ends coupled to block 218, and may support current generated by block 218. Block 218 is in turn coupled to an energy source 215. The energy source 215 may supply the energy to generate current through any of the coils 240, 241, 242 through the current control block 218. In certain exemplary embodiments, the energy source 215 may also store energy generated from the coils 240, 241, 242, e.g., as further described with reference to FIG. 5 hereinbelow.

Figure 3B:
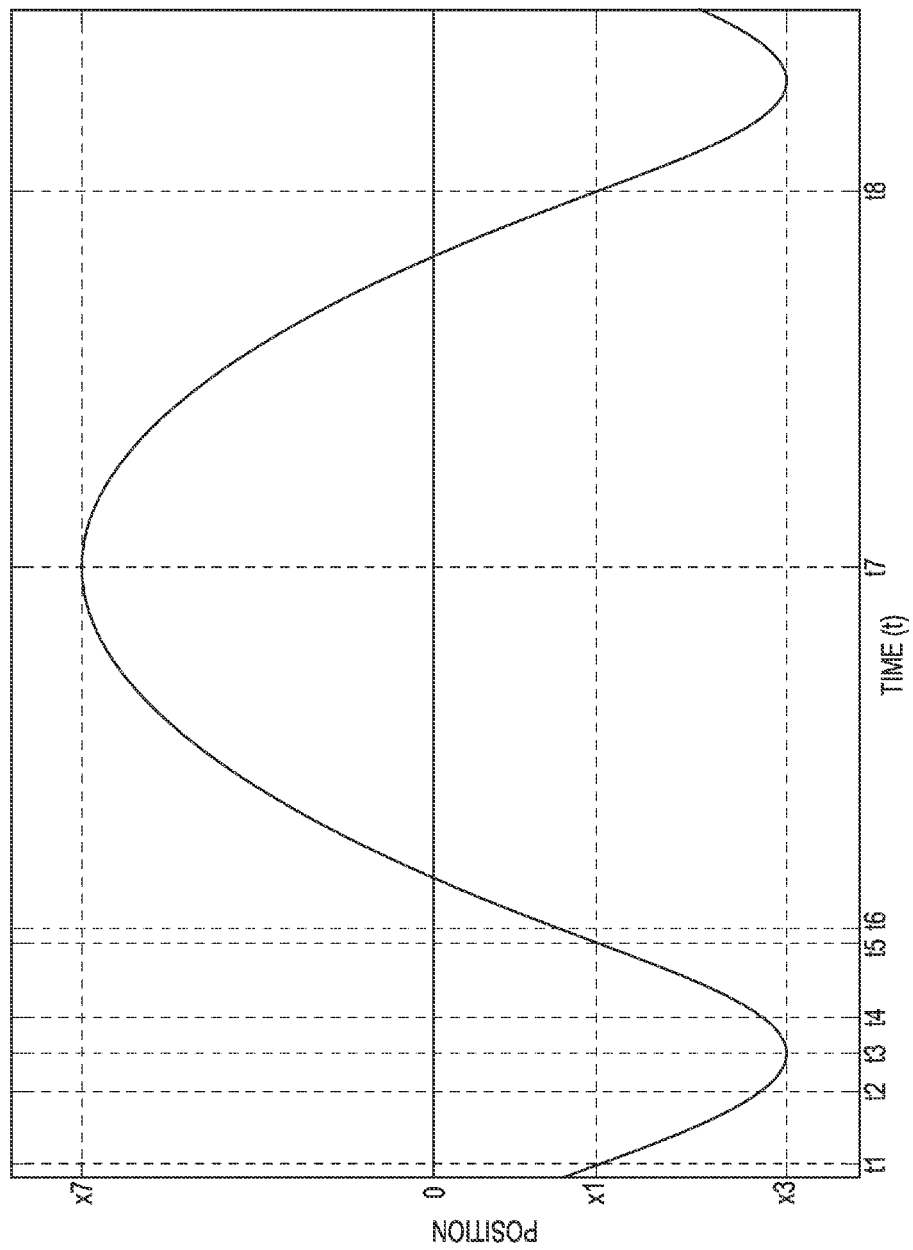

FIGS. 3A, 3B, and 3C illustrate exemplary current, displacement, and velocity profiles, respectively, for the mechanism 200 of FIG. 2. In particular, FIG. 3A illustrates a plot of current through one or more of the coils 240, 241, 242 versus time (t), showing the progression of time from left to right along the horizontal axis. It will be appreciated that as current, force, and acceleration are expected to be proportional to one another, they are shown on a single vertical axis for simplicity. In FIGS. 3B and 3C, the displacement and velocity, respectively, of the magnetic element 220 are plotted versus time (t), assuming the corresponding current is as shown in FIG. 3A. It will be appreciated that FIGS. 3A, 3B, and 3C are shown for illustrative purposes only, and are not meant to limit the scope of the present disclosure to any particular current, displacement or velocity profiles shown.

Arbitrarily fixing t=t1 as corresponding to an "initial" time, it can be seen from FIG. 3B that the magnetic element 220 is initially positioned at x=x1, which lies to the left of the center x=0 of the tube 210. Furthermore, FIG. 3C shows that the magnetic element 220 is initially moving with negative velocity (i.e., in the negative x direction, or to the left of the tube with reference to FIG. 2) at time t=t1.

Referring to the current profile in FIG. 3A, from time t=t1 to t=t5, a positive current is present in the coil, and may be generated by the current control block 218. It will be appreciated that a net current through the coil as exists between t=t1 and t=t5 will generate a magnetic field in the tube 210, which thereby generates a force and corresponding positive acceleration on the magnetic element 220. Consequently, the velocity of the magnetic element 220 is seen to increase in FIG. 3C, while the displacement of the magnetic element 220 is shown to change as shown in FIG. 3B. In particular, in FIG. 3B, the magnetic element 220 is seen to travel from x=x1 at t=t1 to a leftmost extreme of x=x3 at t=t3, whereupon the magnetic element 220 reverses direction and begins traveling in the positive x direction starting at t=t3, and continues to accelerate in the positive x direction until t=t5. During the time t=t1 to t=t5, the magnetic element 220 may be understood as accelerating in the positive x direction in response to the positive current in the coil.

From time t=t5 to t=t8, a current of opposite polariy is applied, e.g., as commanded by the current control block 218. This change in current will be accompanied by a corresponding change in the magnetic field present in the tube 210. Responsive thereto, the magnetic element 220 is seen to experience negative acceleration in FIG. 3C from t=t5 to t=t8, while continuing to move right from x=x1, to a rightmost extreme of x=x7 at t=t7 in FIG. 3B. At t=t7, the magnetic element 220 reverses direction and begins traveling in the negative x direction due to the continued force being applied in the negative x direction. From t=t7 to t=t8, the magnetic element continues moving in the negative x direction until it once again returns to x=x1 at t=t8.

In the exemplary embodiment shown, the magnitude of the negative acceleration from t=t6 to t=t8 is less than the magnitude of acceleration from t=t2 to t=t4, thereby causing the user to feel a net directional impulse in the positive x direction. In general, it will be appreciated that such a directional impulse will be produced if the maximum acceleration of the magnetic element in one direction is greater than the maximum acceleration of the magnetic element in the other direction. Furthermore, it will be appreciated that the waveform from t=t1 to t=t8 in FIG. 3A may be considered to form a single cycle, and may be repeated over multiple cycles to produce a periodic series of directional impulses if desired.

While an exemplary current profile for only one of the coils 240, 241, and 242 is shown in FIG. 3A, one of ordinary skill in the art will appreciate that a composite current profile may be generated by simultaneously controlling independent current profiles of all of the coils 240, 241, and 242 for the mechanism 200. For example, multiple coils may be distributed along the axis of the tube 210 as shown in FIG. 2A, and independently switched in sequence to allow finer control of the displacement profile of the magnetic element 220 over the axis of the tube 210. It will be further appreciated that in alternative exemplary embodiments, fewer or more than the three coils shown in FIG. 2 may readily be accommodated. Such alternative exemplary embodiments are contemplated to be within the scope of the present disclosure.

From FIGS. 3A, 3B, and 3C, it will be appreciated that by actively controlling the current profile over a specific time interval, the displacement profile of the magnetic element 220 may be correspondingly controlled over such time interval. Conversely, changes in the displacement of the magnetic element 220 not due to active current control (e.g., movement of the magnetic element 220 due to user movement, jostling, etc.) may induce currents in the coil or coils according to Faraday's law of induction. In an exemplary embodiment, current in the coil(s) generated by movement of the magnetic element 220 due to such other physical forces may be harvested for energy, as further described hereinbelow.

Figure 4A:
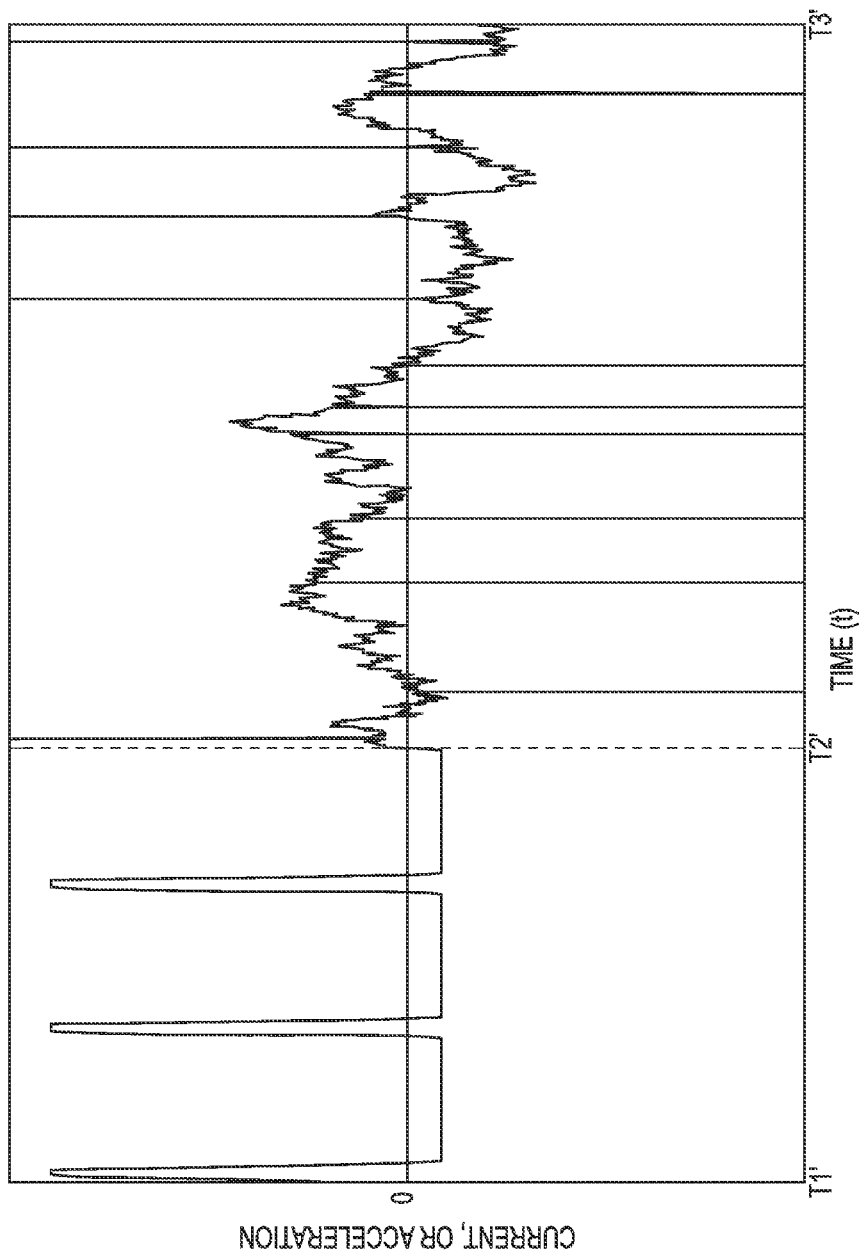
Figure 4B:
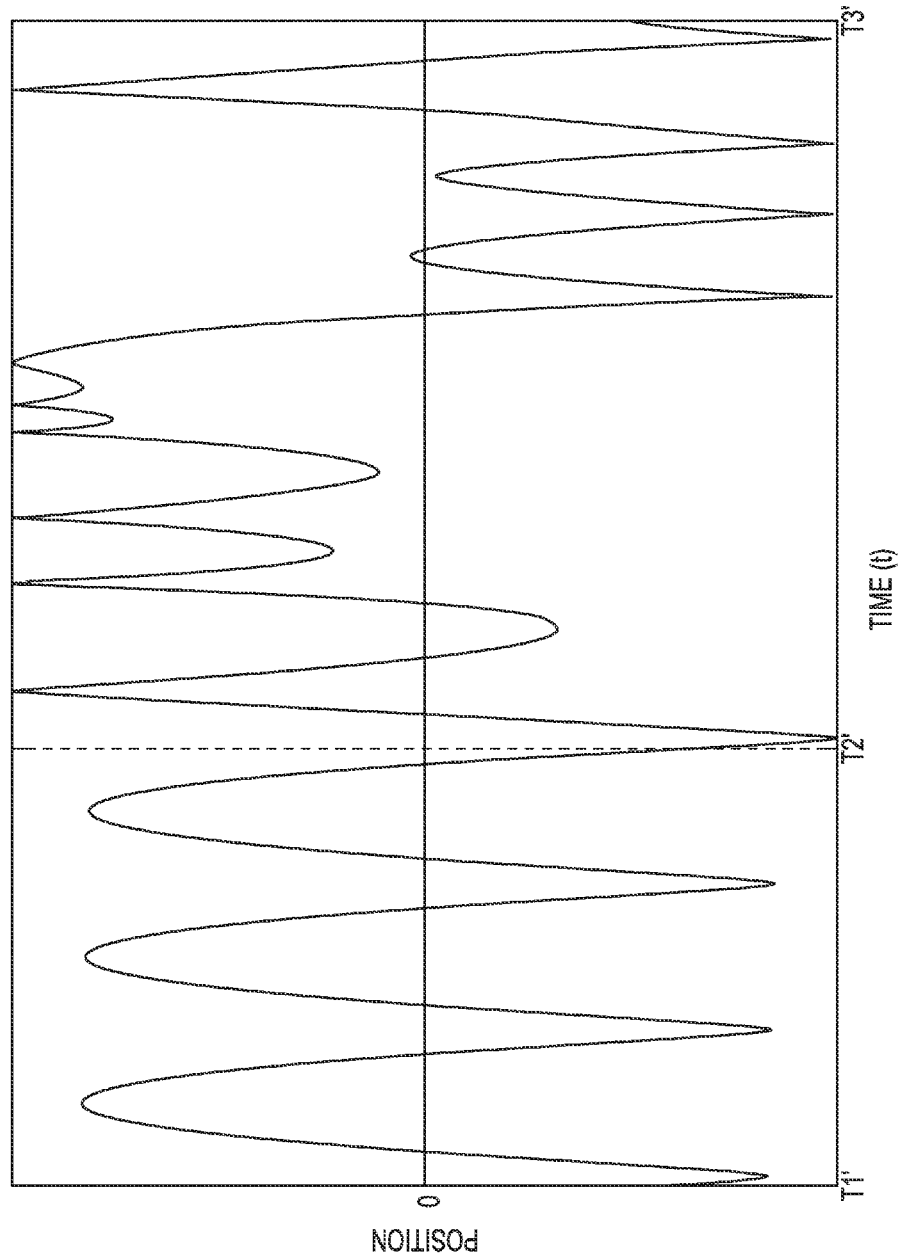

FIGS. 4A, 4B, and 4C illustrate alternative exemplary current, displacement, and velocity profiles for the mechanism 200 of FIG. 2. Again, it will be appreciated that FIGS. 4A, 4B, and 4C are shown for illustrative purposes only, and are not meant to limit the scope of the present disclosure to any particular current and/or displacement profiles shown.

In FIGS. 4A, 4B and 4C, from time t=T1' to t=T2', current through the coil shown is actively controlled by the current control block 218, and current generated by the magnetic element 220 due to other forces is assumed to be negligible. This time interval is also denoted as an "active" interval. During the active interval, variations in the displacement profile of the magnetic element 220 as shown in FIG. 4B are largely caused by the active generation of current by the current control block 218.

From time t=T2' to t=T3', current through the coil shown is not actively controlled by the current control block 218, and other forces on the magnetic element 220 are assumed to cause the variations in coil current shown. This time interval is also denoted as a "passive" interval. During the passive interval, the current profile of the magnetic element 220 as shown in FIG. 4A is caused by variations in the displacement profile of the magnetic element 220 as shown in FIG. 4B.

In an exemplary embodiment, variations in the coil current during the passive interval may be harvested for energy using, e.g., a harvesting mechanism in the current control block 218 such as further described with reference to FIG. 5.

Figure 5:
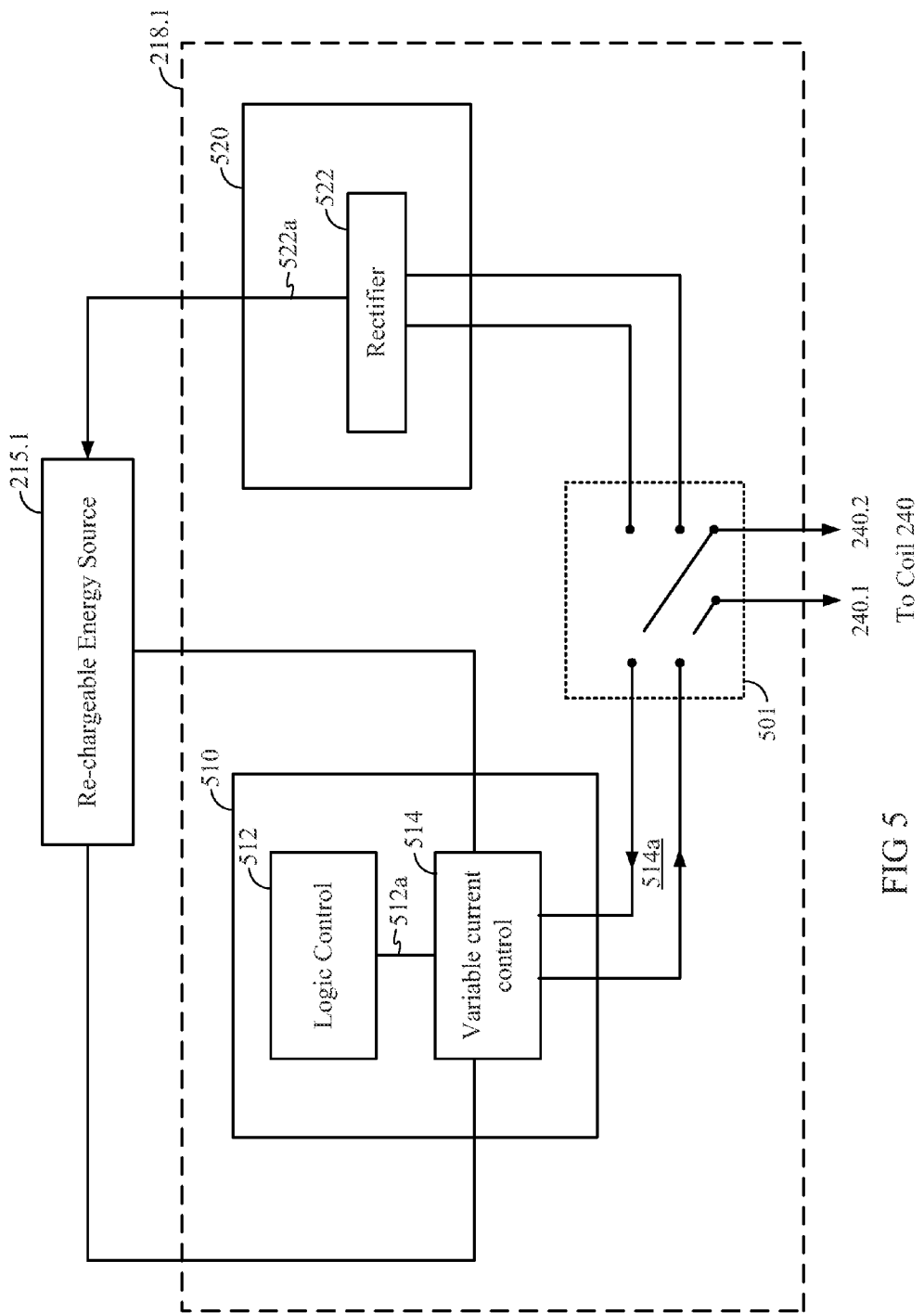
FIG. 5 illustrates exemplary embodiments of a current control block and energy source that can alternately generate a desired current profile during active intervals, as well as harvest energy from a current profile during passive intervals.

FIG. 5 illustrates exemplary embodiments of a current control block 218.1 and energy source 215.1 that can both generate a desired current profile during active intervals, as well as harvest energy from current during passive intervals.

In FIG. 5, the block 218.1 includes a dual-terminal switching element 501 that selectively couples the ends 240.1 and 240.2 of a coil 240 to either an active current generation block 510 during active intervals, or to a harvesting circuit 520 during passive intervals. It will be appreciated that the harvesting circuit 520 may be configured to harvest electrical energy from the kinetic energy of the magnetic element 220 during passive intervals, and charge the re-chargeable energy source 215.1 with the harvested electrical energy. While the switching element 501 is shown as switching only ends 240.1 and 240.2 for the first coil 240, it will be appreciated that a switching element may also readily accommodate additional coils 241, 242, as well as other coils not explicitly shown, according to the present disclosure.

It will be appreciated that the symbol denoting the switching element 501 in FIG. 5 is used only to illustrate the function of the switching element 501, and is not meant to limit the scope of the present disclosure to any particular implementation of a switching element. One of ordinary skill in the art will appreciate that there are a variety of ways in which such a switching element may be implemented, e.g., mechanically, or electronically using transistors and/or other circuit elements, etc. Such exemplary embodiments are contemplated to be within the scope of the present disclosure.

The active current generation block 510 includes a logic control unit 512 for generating a digital representation 512*a* of a desired current profile for the coil 240 during active intervals. The digital representation 512*a* is coupled to a variable current control block 514, which may convert the digital representation 512*a* of the desired current to an analog current 514*a*, which is subsequently provided to the coil 240. During active intervals, power is drawn from the re-chargeable energy source 215.1 through circuitry controlled by the variable current control block 514 to drive the coil 240 with the analog current 514*a*.

In an exemplary embodiment, the variable current control block 514 may be implemented using, e.g., a pulse-width modulation circuit for generating a current whose short-term average value corresponds to the desired current. In alternative exemplary embodiments, the variable current control block 514 may also include, e.g., a digital-to-analog converter (DAC). One of ordinary skill in the art will appreciate that there are a plurality of techniques for generating an analog current according to a digitally specified profile, and such exemplary embodiments are contemplated to be within the scope of the present disclosure.

During passive intervals, the harvesting circuit 520 harvests electrical energy from the coil. In FIG. 5, the charging circuit is shown as including a rectifier 522 that rectifies current from the coil 240 to generate an output voltage. In an exemplary embodiment, the rectifier 522 may be a bi-directional rectifier known in the art capable of rectifying both positive and negative currents. The output voltage 522a may be used to charge the energy source 215.1. Thus during passive intervals, energy is supplied to the re-chargeable energy source 215.1. The energy source 215.1 may be any re-chargeable energy source known in the art, e.g., a re-chargeable battery, a capacitor, etc.

It will be appreciated that in alternative exemplary embodiments, the harvesting circuit 520 may be implemented using any structures known to one of ordinary skill in the art to perform the functions described. For example, the harvesting circuit 520 may alternatively include a voltage up-converter known in the art to generate an output voltage for the energy source 215.1. Such alternative exemplary embodiments are contemplated to be within the scope of the present disclosure.

It will further be appreciated that the re-chargeable energy source 215.1 may also be used to supply energy to modules of a handheld device 100 other than the mechanism 200 for generating directional force impulses. In an exemplary embodiment wherein the current control block 218.1 and re-chargeable energy source 215.1 are utilized in the force impulse generation mechanism 200, the mechanism 200 provides the benefits of both directional impulse generation as well as energy harvesting, which may advantageously extend the overall battery life of the handheld device 100.

Note FIG. 5 is shown for illustrative purposes only, and is not meant to limit the scope of the present disclosure to any particular implementations of the blocks shown. For example, in alternative exemplary embodiments, a mechanism 200 need not incorporate energy harvesting capabilities of the exemplary embodiment shown in FIG. 5. Such alternative exemplary embodiments are contemplated to be within the scope of the present disclosure.

Figure 6A:
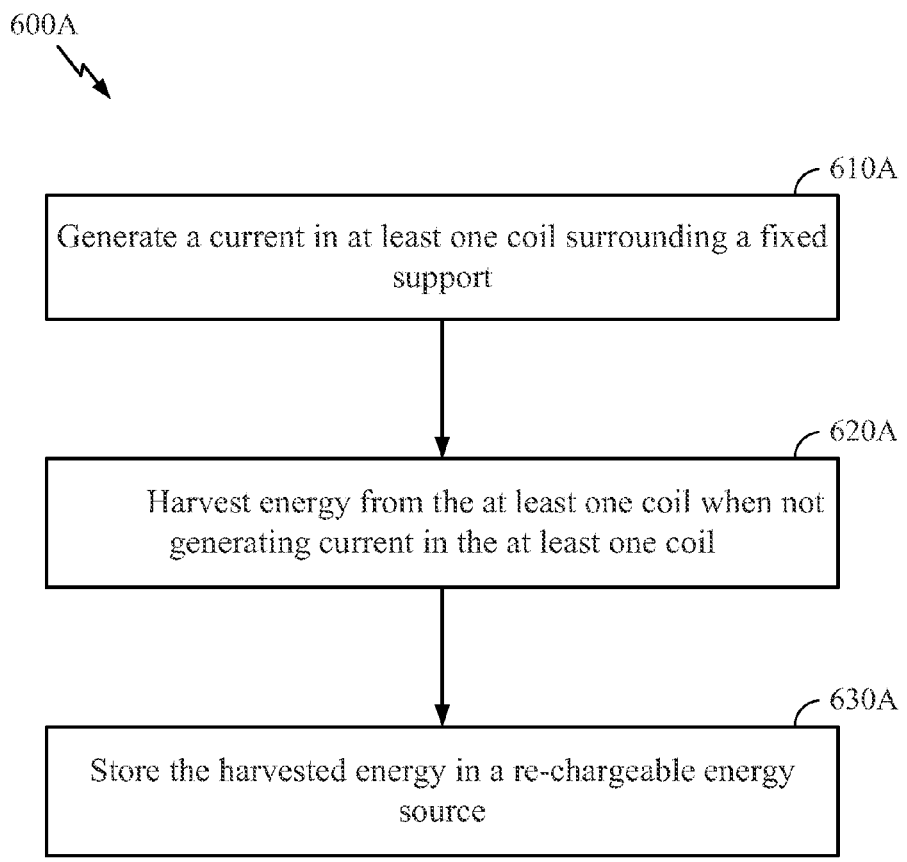
FIGS. 6A and 6B illustrate exemplary embodiments of methods for operating a mechanism incorporating the capabilities shown in FIG. 5.
Figure 6B:
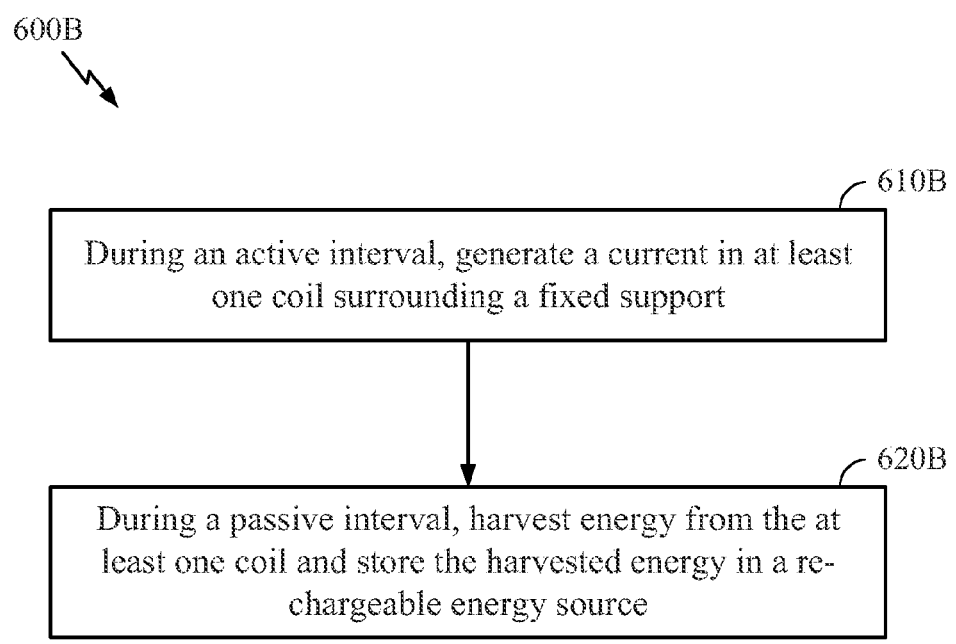

FIGS. 6A and 6B illustrate exemplary embodiments of methods according to the present disclosure.

In FIG. 6A, at block 610A, the method 600A includes generating a current in at least one coil surrounding a fixed support. In an exemplary embodiment, the support is coupled to a magnetic element movable along a first axis of the support. The current may cause the magnetic element to move along the first axis such that, over at least one cycle, the maximum acceleration of the magnetic element in one direction along the first axis is greater than the maximum acceleration of the magnetic element in the other direction along the first axis.

At block 620A, the method includes harvesting energy from the at least one coil when not generating current in the at least one coil.

At block 630A, the method includes storing the harvested energy in a re-chargeable energy source.

In FIG. 6B, at block 610B, the method 600B includes, during an active interval, generating a current in at least one coil surrounding a fixed support. In an exemplary embodiment, the support is coupled to a magnetic element movable along a first axis of the support, and the current causes the magnetic element to move along the first axis.

At block 620B, during a passive interval, the method includes harvesting energy from the at least one coil and storing the harvested energy in a re-chargeable energy source.

Figure 7:
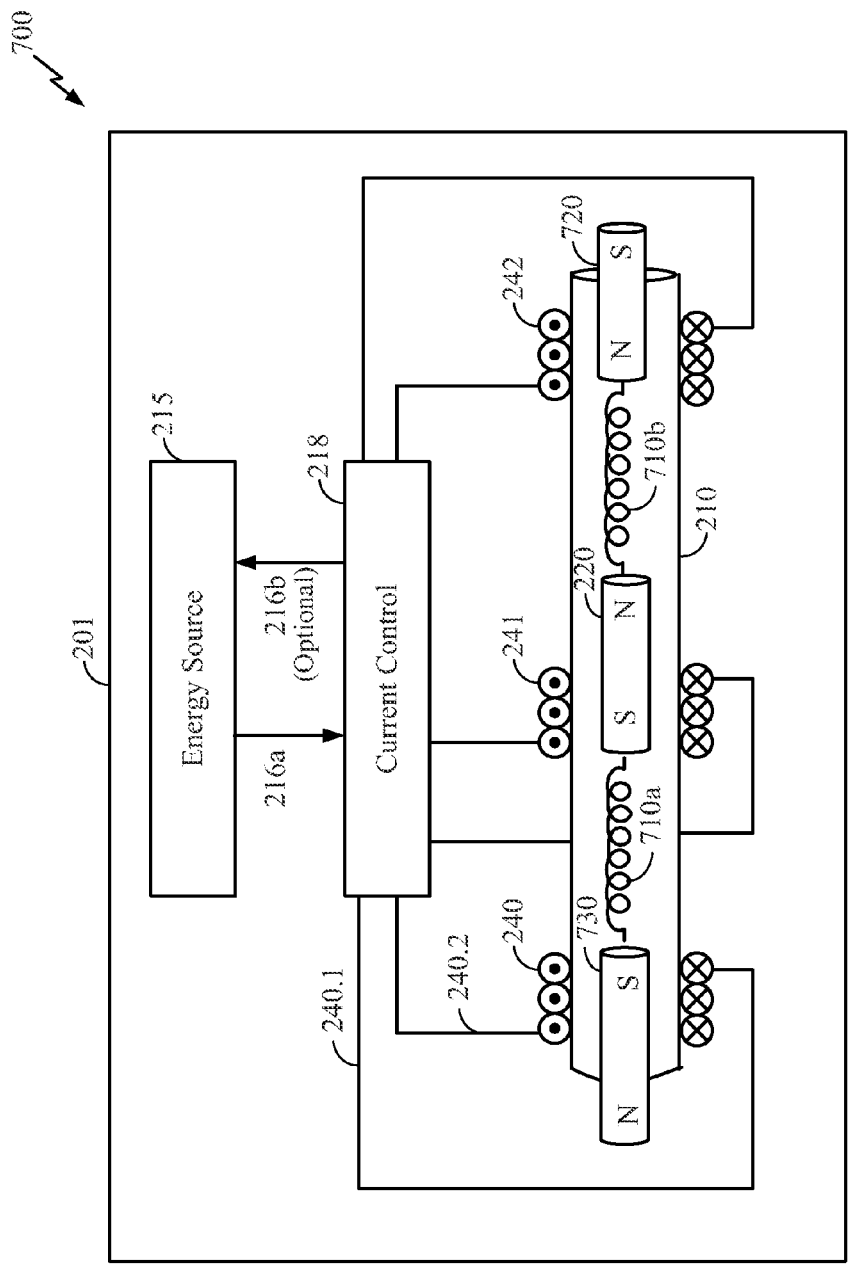
FIG. 7 illustrates an alternative exemplary embodiment of a mechanism for generating directional impulses according to the present disclosure.

FIG. 7 illustrates an alternative exemplary embodiment 700 of a mechanism for generating directional impulses according to the present disclosure. As shown in FIG. 7, one or more auxiliary magnets 720, 730 may be provided at the ends of the tube 210. For example, the auxiliary magnet 720 may be physically fixed at one end of the tube 210, and the auxiliary magnet 730 may be physically fixed at the other end. The polarity of the auxiliary magnet 720 may be chosen such that it repels the closer end of the magnetic element 220, and similarly for auxiliary magnet 730. For example, the north pole (N) of the auxiliary magnet 720 is oriented toward the north pole (N) of the magnetic element 220, while the south pole (S) of the auxiliary magnet 730 is oriented toward the south pole (S) of the magnetic element 220. In this manner, whenever the magnetic element 220 approaches the auxiliary magnet 720, a repulsive force will be generated between the magnets 220 and 720 that will push the magnetic element 220 back towards its initial position.

FIG. 7 further illustrates that one or more biasing springs 710a, 710b may be provided. One end of the biasing spring 710a is attached to the magnetic element 220, while another end is attached to one end of the tube, e.g., to one end of the magnet 730. Similarly, one end of the biasing spring 710b is attached to the magnetic element 220, while another end is attached to another end of the tube, e.g., to one end of the magnet 720. It will be appreciated that the biasing springs 710a, 710b may generate forces to pull and push the magnetic element 220 back to an initial position whenever it is displaced.

In an alternative exemplary embodiment, a single magnet may be provided at the center of the tube 210 to bias the magnetic element 220 towards the center. For example, a ring magnet may be wrapped around the circumference of the tube 210 near its center (e.g., x=0 according to FIG. 2). Such alternative exemplary embodiments are contemplated to be within the scope of the present disclosure.

By providing one or more biasing springs and/or one or more auxiliary magnets as described in FIG. 7, the mechanism 700 may require the current control block 218 to generate less current in the coils 240, 241, and 242 to bring the magnet back to its initial position, thus reducing power consumption and/or the complexity of the control method.

It will be appreciated that in certain exemplary embodiments, the one or more auxiliary magnets need not be employed in conjunction with the one or more biasing springs, and either feature can be incorporated independently of the others. In alternative exemplary embodiments, the magnetic element 220 may specifically incorporate a non-magnetic mass (not shown) to increase the total mass of the magnetic element 220, such that the directional force impulse generated may be more clearly felt by the user. For example, such non-magnetic mass may be a battery of the handheld device 100. In alternative exemplary embodiments, more than one magnetic element 220 may also be incorporated. Such alternative exemplary embodiments are contemplated to be within the scope of the present disclosure.

Figure 8A:
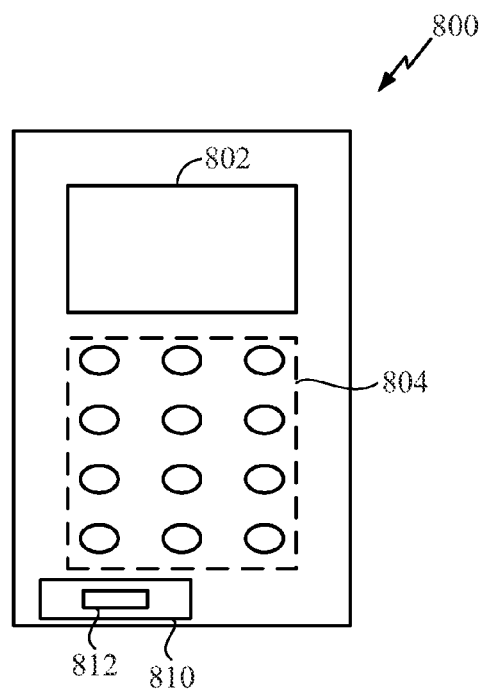
FIG. 8A is a drawing illustrating a mobile device for providing dynamic feedback according to one embodiment.

The motion induction techniques and mechanisms described above may be employed in, for example, mobile devices. FIG. 8A is a drawing illustrating a mobile device for providing dynamic feedback according to one embodiment. A mobile device 800 includes a display 802 and an input device 804. According to one embodiment, the mobile device 800 is a cellular phone and the input device 804 is a keypad.

The input device 804 may also be a tracking pad, a track ball, cursor keys, or other input devices. Additionally, the display 802 may be touch sensitive.

The mobile device 800 includes a motion induction device 810. According to one embodiment, the motion induction device 810 includes a mass 812, which is accelerated within the motion induction device 810 to generate motion. The mass 812 may tap an object (not shown) in the motion induction device 810. According to one embodiment, the mass 812 is between approximately $1/16$ to $1/2$ ounce. Depending on the material of the object and the mass 812, noise may be made. For example, if the mass 812 is a magnet and the object is metallic, an audible sound is created when the mass 812 taps the object.

According to one embodiment, a setting is available in the mobile device 800 to control the acceleration of the mass 812. For example, the motion induction device 810 may be configured to accelerate the mass 812 to tap an object. If the motion induction device 810 is configured for silent mode, the mass 812 may be accelerated and decelerated to prevent tapping an object.

In one embodiment, the motion induction device 810 is controlled by the mobile device 800 to convey context, content, or type of messages received to a user of the mobile device 800. The received messages may include, for example, short text messaging (SMS) service messages, multimedia messaging service (MMS) messages, e-mail messages, voice mail messages, messages about missed calls, and messages including directions for navigation. For example, the mobile device 800 may control the motion induction device 810 to notify the user of different contexts of messages by providing dynamic force feedback. For example, a tapping frequency may be varied from approximately 0 to 25 Hertz. According to one embodiment as an alert becomes more urgent, the tapping frequency increases. For example, when an incoming call arrives at the mobile device 800, a first ring is at 5 Hz, a second ring is at 10 Hz, and a third ring is at 15 Hz.

Additionally, the amplitude of tapping by the motion induction device 810 may be varied by the mobile device 800. For example, the acceleration of the mass 812 by the motion induction device 810 may be increased or decreased. According to one embodiment, as an alert become more urgent the tapping amplitude increases.

The mobile device 800 may control the motion induction device 810 to convey information to the user. For example, the motion induction device 810 may be controlled to tap different sequences of messages to the user. According to one embodiment, a tapping sequence is defined to identify an incoming caller (or group of incoming callers) without the user viewing the display 802. For example, a five tap sequence may indicate a family member is calling and a three tap sequence may indicate a co-worker is calling. According to another embodiment, a tapping sequence is defined to identify a message type received at the mobile device 800. For example, when a short message service (SMS) message is received, the motion induction device 810 is activated to perform two short taps followed by a long tap, but when an email message is received the motion induction device 810 is activated to perform two long taps followed by a short tap.

The mobile device 800 may control the motion induction device 810 to convey content to the user. For example, the motion induction device 810 may be controlled to tap different sequences, different amplitudes, or different frequencies to convey a received message. According to one embodiment, a sequence of short taps with low amplitude may be a message indicating "arrived at destination safely." Alternatively, a sequence of long taps with large amplitude may be a message indicating "lost, need directions." These messages may be sent, for example, from a child to a parent to ease the parent's mind. Conveying the information without the parent viewing the display 802 increases convenience for the parent.

The dynamic feedback provided by the motion induction device 810 provides information to the user without the user looking at the display 802. A wide variety of information may be conveyed by the motion induction device such as, for example, incoming call, caller id, caller group, incoming message, message type, low battery, calendar reminder, music player notifications, and position location (e.g. GPS) direction. Each of these alerts and additional alerts may be configured through software on the mobile device 800 through interactions with the display 802 and the input device 804. Additionally, the motion induction device 810 may consume a limited amount of power to perform acceleration of the mass 812.

Figure 8B:
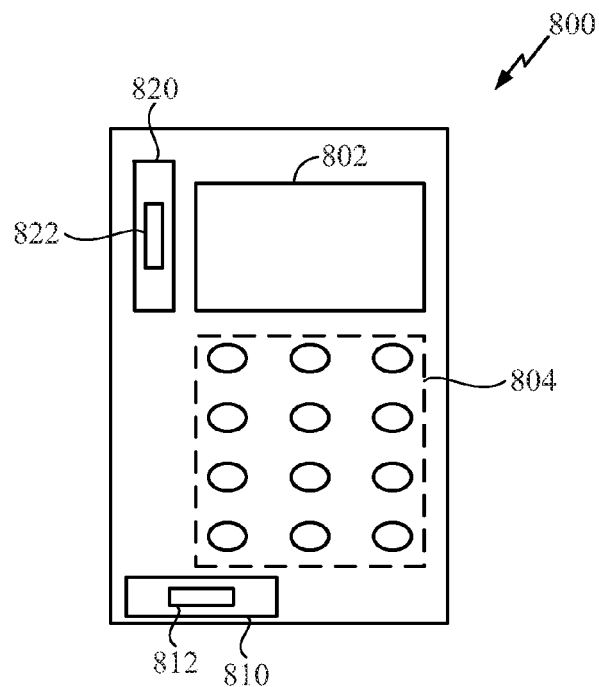
FIG. 8B is a drawing illustrating a mobile device for providing dynamic feedback in multiple directions according to one embodiment.

Dynamic force feedback in the mobile device 800 may be applied in multiple dimensions. FIG. 8B is a drawing illustrating a mobile device for providing dynamic feedback in multiple directions according to one embodiment. The mobile device 800 may also include a second motion induction device 820 having a mass 822. The motion induction device 820 may be identical to or different from the motion induction device 810. According to one embodiment, the motion induction device 820 is oriented at approximately a 90 degree angle with the motion induction device 810. In this arrangement, the mobile device 800 may provide dynamic feedback to the user in multiple dimensions. Although only two motion induction devices are illustrated, the mobile device 800 may include additional induction devices.

The mobile device 800 may be configured to provide different alerts along different directions of the mobile device 800. For example, a user may be notified of an incoming email message with two horizontal taps, and the user may be notified of an incoming text message with two vertical taps. According to one embodiment, the multiple dimension dynamic force feedback guides the user by providing force feedback oriented in geographical directions. According to another embodiment, the mobile device 800 activates both motion induction devices 810, 820 to provide dynamic force feedback. For example, in navigation a user may be directed up and left by activating both motion induction devices 810, 820.

Figure 8C:
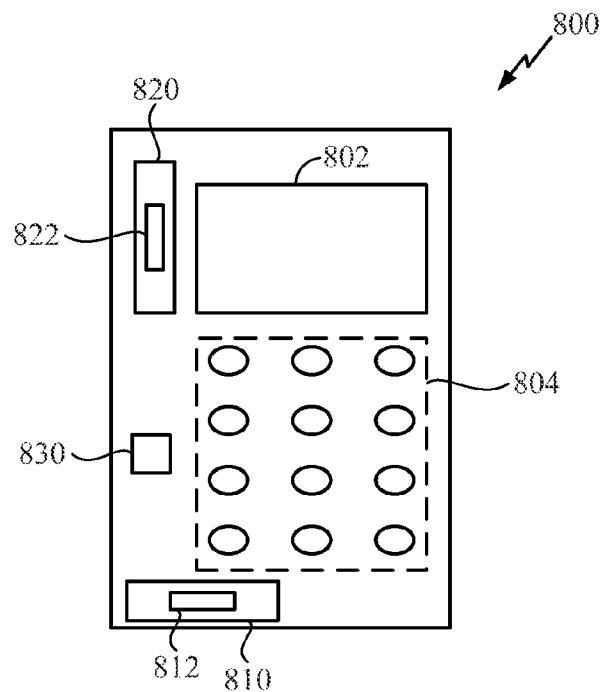
FIG. 8C is a drawing illustrating a mobile device for providing dynamic feedback and sensing the environment around the mobile device according to one embodiment.

The mobile device 800 may be configured to provide tapping dynamic feedback through the motion induction device 810 and the motion induction device 820 depending on an environment in which the mobile device 800 is located. FIG. 8C is a drawing illustrating a mobile device for providing dynamic feedback and sensing the environment around the mobile device according to one embodiment. The mobile device 800 includes a sensor 830 such as, for example, an accelerometer, compass, inclinometer, camera, heat sensor, touch sensor, proximity sensor, or pressure sensor. According to one embodiment, the sensor 830 is an accelerometer for determining the orientation of the mobile device 800. The sensor 830 may provide other information to the mobile device 800 when selecting dynamic feedback to provide to the user. According to another embodiment, the sensor 830 is a compass for determining the geographical orientation of the user when providing dynamic feedback for directional guidance. According to another embodiment, the sensor 830 is a thermometer for determining if the mobile device 800 has been placed in a user's pocket. The thermometer may provide the mobile device 800 with information about which side of the mobile device is facing the user. According to another embodiment, the sensor 830 is a proximity sensor for detecting whether the user is in proximity with the mobile device 800. For example, when the mobile device 800 is being held close to a user's ear, an amplitude of the motion induction devices 810, 820 may be reduced.

Figure 9A:
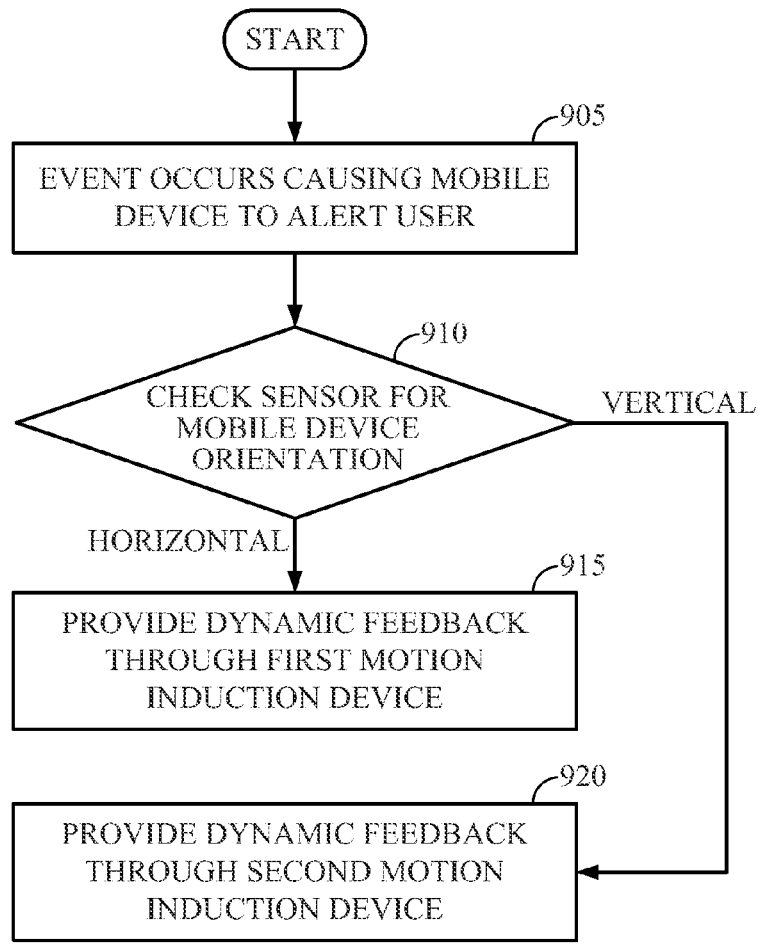
FIGS. 9A and 9B are flow charts illustrating operation of a mobile device for providing dynamic feedback, according to one embodiment.

FIG. 9A is a flow chart illustrating operation of a mobile device for providing dynamic feedback in multiple dimensions according to one embodiment. At block 905 an event occurs causing the mobile device 800 to alert the user. The mobile device 800 may be configured, through software, with specific events that cause the user to be alerted through dynamic force feedback. At block 910 the mobile device 800 queries the sensor 830 to determine the orientation of the mobile device 800. If the mobile device is oriented approximately horizontal, the mobile device 800 proceeds to block 915 to provide dynamic feedback through the motion induction device 810. If the mobile device is oriented approximately vertical, the mobile device 800 proceeds to block 920 to provide dynamic feedback through the motion induction device 820.

Figure 8D:
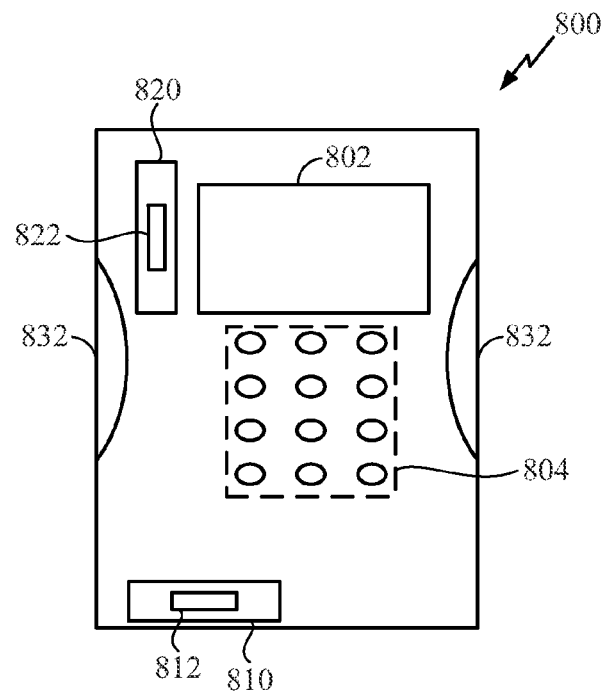
FIG. 8D is a drawing illustrating a mobile device for providing dynamic feedback and sensing pressure on the mobile device according to one embodiment.

Additional information may be provided to the mobile device 800 for providing dynamic feedback to the user. FIG. 8D is a drawing illustrating a mobile device for providing dynamic feedback and sensing pressure on the mobile device according to one embodiment. The mobile device 800 includes a pressure sensor 832. According to one embodiment, the pressure sensor 832 determines how strongly a user is holding the mobile device 800. The mobile device 800 may change the amplitude and/or frequency of tapping provided through the motion induction device 810 and the motion induction device 820 based on information from the pressure sensor 832. For example, if a user is strongly gripping the mobile device 800, the amplitude of tapping of the motion induction device 810 and the motion induction device 820 is increased.

Figure 9B:
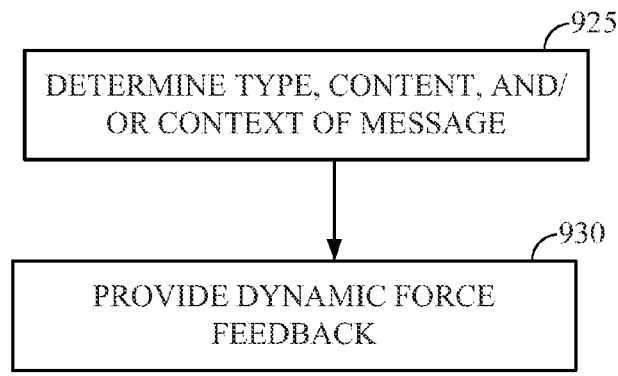

FIG. 9B is a flow chart illustrating operation of a mobile device for providing dynamic feedback, in another embodiment. At block 925 a type, a content, and/or a context of a message received from a remote user is determined to convey to a local user of a device. At block 930 dynamic force feedback is provided, depending on the type, the content or the context of the message.

Figure 10:
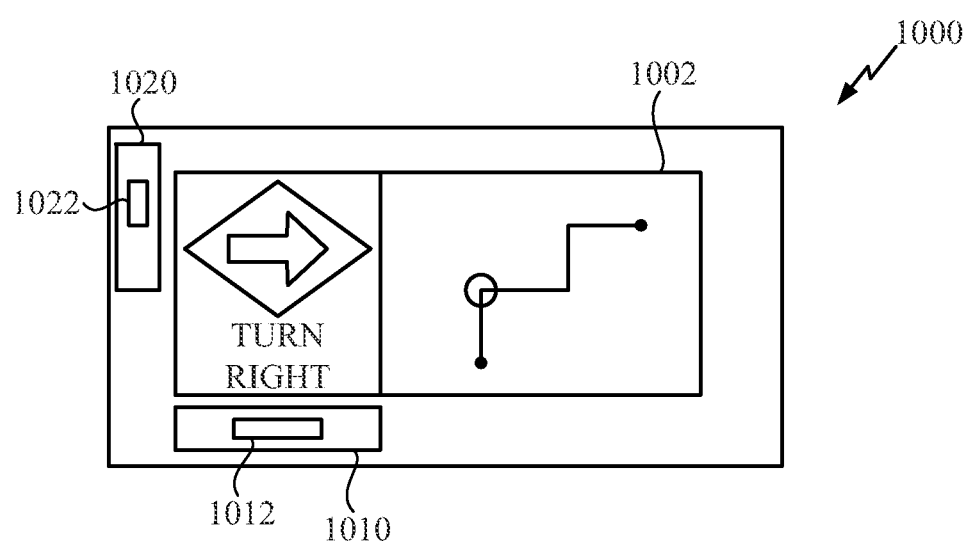
FIG. 10 is a drawing illustrating a mobile device for providing dynamic feedback and directions according to one embodiment.

Dynamic feedback may be provided in navigation devices. FIG. 10 is a drawing illustrating a mobile device for providing dynamic feedback and directions according to one embodiment. A navigation device 1000 includes a display 1002. The display 1002 may show visual directions or maps. According to one embodiment, the navigation device 1000 is a global positioning system (GPS) device.

The navigation device 1000 also includes a motion induction device 1010 including a mass 1012 and a motion induction device 1020 including a mass 1022. According to one embodiment, the motion induction device 1010 is oriented approximately orthogonal to the motion induction device 1020.

Directions may be entered into the navigation device 1000 through the display 1002 or downloaded to the navigation device 1000. As directions are provided to the user, dynamic feedback may be provided through the motion induction devices 1010, 1020. For example, if the current direction to the user is to turn right, the motion induction device 1010 may tap right. Alternatively, if the current direction to the user is to turn left, the motion induction device 1010 may tap left. If the current direction to the user it to turn around, the motion induction device 1020 may tap down. According to one embodiment, the amplitude or frequency of the tapping provided by the motion induction devices 1010, 1020 increases as the user approaches the location where the direction should be executed. For example, as a user approaches an intersection where the user should turn right, the tapping amplitude of the motion induction devices 1010, 1020 increases.

According to one embodiment, the navigation device 1000 is used for pedestrian navigation. For example, a user walking through a city places the navigation device 1000 in their pocket after programming directions into the navigation device 1000. As the user walks through the city the user receives tapping from the navigation device 1000 indicating which direction to walk. According to one embodiment, the navigation device 1000 includes a sensor for determining the orientation of the navigation device 1000 and activating the appropriate motion induction devices 1010, 1020. According to another embodiment, the navigation device 1000 determines an orientation from a position location receiver embedded in the navigation device 1000.

Dynamic feedback may be useful for providing handicap assistance. For example, dynamic feedback from a navigation device 1000 may be used to guide the blind. According to one embodiment, the dynamic feedback is incorporated into a cane, a belt, or a wrist watch.

Providing dynamic feedback in mobile devices improves the user's experience by providing information to the user without the user viewing the display of the mobile device. For example, directions, call notification, caller id, and incoming message type may be conveyed to a user by a sequence of taps provided by motion induction devices. Additionally, tapping provided by the motion induction devices is a more natural and human-like method for getting the attention of the user. Thus, the tapping is more likely to direct the user's attention to the event occurring on the mobile device, as opposed to vibration.

Figure 11:
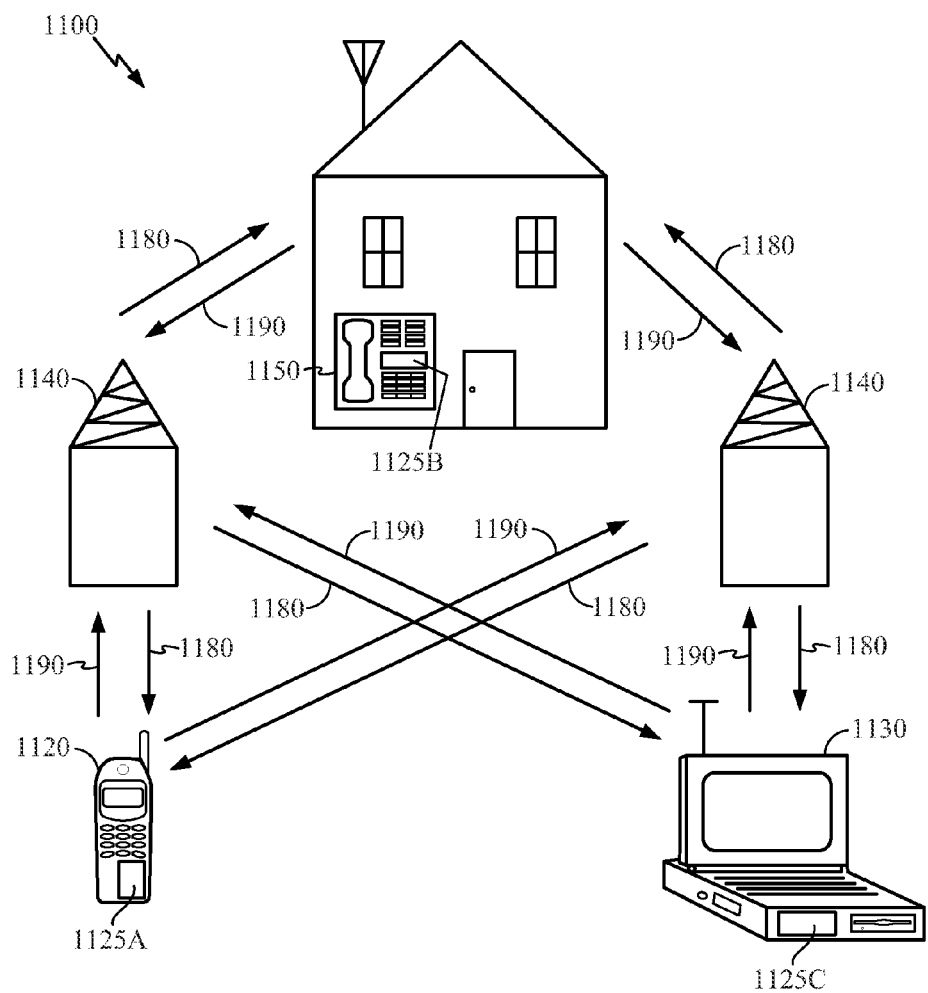
FIG. 11 is a diagram illustrating an exemplary wireless communication system in which an embodiment of the disclosure may be advantageously employed.

FIG. 11 shows an exemplary wireless communication system 1100 in which an embodiment of the disclosure may be advantageously employed. For purposes of illustration, FIG. 11 shows three remote units 1120, 1130, and 1150 and two base stations 1140. It will be recognized that wireless communication systems may have many more remote units and base stations. Remote units 1120, 1130, and 1150 include motion induction devices 1125A, 1125C, and 1125B, respectively, which are embodiments as discussed above. FIG. 11 shows forward link signals 1180 from the base stations 1140 and the remote units 1120, 1130, and 1150 and reverse link signals 1190 from the remote units 1120, 1130, and 1150 to base stations 1140.

In FIG. 11, remote unit 1120 is shown as a mobile telephone, remote unit 1130 is shown as a portable computer, and remote unit 1150 is shown as a computer in a wireless local loop system. For example, the remote units may be cell phones, mobile phones, computers, set top boxes, music players, video players, entertainment units, hand-held personal communication systems (PCS) units, portable data units such as personal data assistants, or fixed location data units such as meter reading equipment. Although FIG. 11 illustrates remote units according to the teachings of the disclosure, the disclosure is not limited to these exemplary illustrated units. The disclosure may be suitably employed in any device which includes stacked ICs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosure.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an application specific integrated circuit (ASIC). The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   determining first parameters comprising a type, a content, and/or a context of a message received from a remote user to convey to a local user of a device;
   generating a current in at least one coil surrounding a fixed support coupled to a magnetic element to provide dynamic force feedback by displacing the magnetic element within the fixed support, the current generating controlled by a controller;
   providing the dynamic force feedback to the local user in a first direction relative to the local user depending on the type, the content or the context of the message;
   harvesting energy from the at least one coil independent of generated current controlled through the controller; and
   storing the harvested energy in a re-chargeable energy source.

2. The method of claim 1, in which providing the dynamic force feedback comprises tapping the local user of the device.

3. The method of claim 1, further comprising:
   providing dynamic force feedback of a first amplitude when the first parameters are for a first type of received message; and
   providing dynamic force feedback of a second amplitude when the first parameters are for a second type of received message, the second amplitude differing from the first amplitude.

4. The method of claim 3, in which the first type of received message is a telephone call and the second type of received message is a short message service (SMS) message.

5. The method of claim 1, further comprising:
   providing dynamic force feedback of a first frequency when the first parameters are for a first type of received message; and providing dynamic force feedback of a second frequency when the first parameters are for a second type of received message, the second frequency differing from the first frequency.

6. The method of claim 1, further comprising providing dynamic force feedback in a third direction relative to the local user based at least in part on the proximity of the device.

7. The method of claim 1, in which providing dynamic force feedback produces no audible sound.

8. The method of claim 1, further comprising increasing at least an amplitude and/or a frequency of the dynamic force feedback according to an urgency of the received message.

9. The method of claim 1, in which the device is a set top box, music player, video player, entertainment unit, navigation device, communications device, personal digital assistant (PDA), fixed location data unit, and/or a computer.

10. A method, comprising:
    determining first parameters comprising a type, a content, and/or a context of a message received from a remote user to convey to a local user of a device;
    generating a current in at least one coil surrounding a fixed support coupled to a magnetic element to provide dynamic force feedback by displacing the magnetic element within the fixed support, the current generating controlled by a controller;
    providing the dynamic force feedback to the local user, the dynamic force feedback providing a direction to geographically guide the local user;
    harvesting energy from the at least one coil independent of generated controlled through the controller; and
    storing the harvested energy in a re-chargeable energy source.

11. The method of claim 10, in which the dynamic force feedback is in a first direction via a first motion induction device when the second parameters are for a first orientation of the device.

12. A device, comprising:
    a first motion induction device having a mass;
    a second motion induction device having a mass, the first and the second motion induction devices configured to generate a current in at least one coil surrounding a fixed support coupled to a magnetic element to provide dynamic force feedback by displacing the magnetic element within the fixed support; and
    a controller configured to control the current generation and to:
        operate the mass of the first motion induction device to provide the dynamic force feedback in the device in at least one direction, the dynamic force feedback being conveyed based at least in part on:
            first parameters comprising a type, a content, and/or a context of a message to convey to a local user of the device;
        harvest energy from the at least one coil, in which the energy is harvested independent of generated current controlled through the controller; and
        store the harvested energy in a re-chargeable energy source.

13. The device of claim 12, in which the second motion induction device is oriented approximately orthogonal to the first motion induction device.

14. The device of claim 12, in which the device is a set top box, music player, video player, entertainment unit, navigation device, communications device, personal digital assistant (PDA), fixed location data unit, and/or a computer.

15. A device, comprising:
    means for inducing motion to generate a current in at least one coil surrounding a fixed support coupled to a magnetic element to provide dynamic force feedback by displacing the magnetic element within the fixed support, the current generation controlled by a controller;
    means for operating the motion inducing means to provide the dynamic force feedback in the device in at least one direction, the dynamic force feedback being conveyed based at least in part on:
        first parameters comprising a type, a content, and/or a context of a message to convey to a local user of the device;
    means for harvesting energy from the at least one coil independent of generated current controlled through the controller; and
    means for storing the harvested energy in a re-chargeable energy source.

16. The device of claim 15, in which the device is a set top box, music player, video player, entertainment unit, navigation device, communications device, personal digital assistant (PDA), fixed location data unit, and/or a computer.

17. A computer program product for controlling feedback of a device, comprising:
    a non-transitory computer-readable medium having non-transitory program code recorded thereon, the program code comprising:
        program code to determine first parameters comprising a type, a content, and/or a context of a message received from a remote user to convey to a local user of a device;
        program code to generate a current in at least one coil surrounding a fixed support coupled to a magnetic element to provide dynamic force feedback by displacing the magnetic element within the fixed support, the current generating controlled by a controller;
        program code to control the dynamic force feedback to the local user in a first direction relative to the local user depending on the type, the content or the context of the message;
        program code to harvest energy from the at least one coil independent of current generated through the controller; and
        program code to store the harvested energy in a re-chargeable energy source.

18. The computer program product of claim 17, in which the program code to control a dynamic force feedback is further configured to control the dynamic force feedback based on the proximity of the device.

19. The computer program product of claim 17, in which the program code further comprises program code to control the device to tap the local user of the device.

* * * * *